United States Patent
Zhang et al.

(10) Patent No.: US 11,014,994 B2
(45) Date of Patent: *May 25, 2021

(54) OLEFIN COORDINATION POLYMERIZATION CATALYST, AND PREPARATION METHOD AND APPLICATION THEREOF

(71) Applicant: PetroChina Company Limited, Beijing (CN)

(72) Inventors: Mingge Zhang, Beijing (CN); Dianjun Li, Beijing (CN); Shuo Wang, Beijing (CN); Hongming Li, Beijing (CN); Yuan Yuan, Beijing (CN); Jianjun Yi, Beijing (CN); Tianxu Sun, Beijing (CN); Jing Mao, Beijing (CN); Lin Men, Beijing (CN); Qigu Huang, Beijing (CN); Runcong Zhang, Beijing (CN); Jing Wang, Beijing (CN); Yanpei Nie, Beijing (CN)

(73) Assignee: PetroChina Company Limited, Beijing (CN)

(*) Notice: Subject to any disclaimer, the term of this patent is extended or adjusted under 35 U.S.C. 154(b) by 113 days.

This patent is subject to a terminal disclaimer.

(21) Appl. No.: 16/161,894

(22) Filed: Oct. 16, 2018

(65) Prior Publication Data

US 2019/0048106 A1 Feb. 14, 2019

Related U.S. Application Data

(63) Continuation of application No. PCT/CN2017/074498, filed on Feb. 23, 2017.

(30) Foreign Application Priority Data

May 4, 2016 (CN) .......................... 201610289266.1

(51) Int. Cl.
| | | |
|---|---|---|
| C08F 4/646 | (2006.01) |
| C08F 210/16 | (2006.01) |
| C08F 10/00 | (2006.01) |
| C08F 4/649 | (2006.01) |
| C08F 10/02 | (2006.01) |
| C08F 10/06 | (2006.01) |

(52) U.S. Cl.
CPC ............ *C08F 4/646* (2013.01); *C08F 4/6494* (2013.01); *C08F 4/6495* (2013.01); *C08F 4/6497* (2013.01); *C08F 10/00* (2013.01); *C08F 10/02* (2013.01); *C08F 10/06* (2013.01); *C08F 210/16* (2013.01)

(58) Field of Classification Search
None
See application file for complete search history.

(56) References Cited

U.S. PATENT DOCUMENTS

| | | |
|---|---|---|
| 4,861,847 A | 8/1989 | Mao et al. |
| 2002/0082160 A1 | 6/2002 | Yashiki et al. |
| 2004/0082740 A1 | 4/2004 | Gray et al. |
| 2006/0217261 A1 | 9/2006 | Morini et al. |
| 2019/0048106 A1 | 2/2019 | Zhang et al. |

FOREIGN PATENT DOCUMENTS

| | | |
|---|---|---|
| CN | 85100997 A | 1/1987 |
| CN | 1140722 A | 1/1997 |
| CN | 1771266 A | 5/2006 |
| CN | 1803864 A | 7/2006 |
| CN | 101125897 A | 2/2008 |
| CN | 101215344 A | 7/2008 |
| CN | 101353385 A | 1/2009 |
| CN | 106519084 A | 1/2009 |
| CN | 101407561 A | 4/2009 |
| CN | 101456924 A | 6/2009 |
| CN | 101891849 A | 11/2010 |
| CN | 101906180 A | 12/2010 |
| CN | 102492061 A | 6/2012 |
| CN | 102558404 A | 7/2012 |

(Continued)

OTHER PUBLICATIONS

International Search Report for International Application No. PCT/CN2017/074498 "Olefin Coordination Polymerization Catalyst, and Preparation Method and Application Thereof", dated May 26, 2017.

(Continued)

*Primary Examiner* — Yun Qian

(74) *Attorney, Agent, or Firm* — Hamilton, Brook, Smith & Reynolds, P.C.

(57) ABSTRACT

The present invention relates to an olefin coordination polymerization catalyst and a preparation method and application thereof. The olefin polymerization catalyst consists of a primary catalyst mainly prepared from a magnesium compound, a transition metal halide, a $C_2$-$C_{15}$ alcohol and an electron donor in a molar ratio of 1:1-40:0.01-10:0.001-10, and a co-catalyst which is an organoaluminum compound; and the molar ratio of the transition metal halide to the co-catalyst is 1:10-500. The catalyst of the present invention has a good particle morphology, and a spherical shape, and the catalyst particles do not stick to the vessel wall; the catalyst has high activity and excellent hydrogen regulation performance, and the melt index MFR of polyethylene may be adjusted within 0.01 g/10 min-550 g/10 min; and the catalyst is applicable in slurry polymerization process, loop reactor polymerization process, gas phase polymerization process or combined polymerization process.

17 Claims, No Drawings

(56) References Cited

FOREIGN PATENT DOCUMENTS

| | | |
|---|---|---|
| CN | 102911299 A | 2/2013 |
| CN | 103073662 A | 5/2013 |
| CN | 103613690 A | 3/2014 |
| CN | 104211844 A | 12/2014 |
| CN | 104710549 A | 6/2015 |
| CN | 104829758 A | 8/2015 |
| CN | 105384854 A | 3/2016 |
| CN | 105622799 A | 6/2016 |
| EP | 1108728 A1 | 6/2001 |
| JP | 2013095768 A | 5/2013 |

OTHER PUBLICATIONS

International Preliminary Report on Patentability for International Application No. PCT/CN2017/074498 "Olefin Coordination Polymerization Catalyst, and Preparation Method and Application Thereof", dated Nov. 6, 2018.

Werle, P., et al., Identification of By-Products in Pentaerythritol Process Liquors,, Liebigs Annalen der Chemie, 1985(5): 1082-1087 (May 13, 1985).

Non-final Office Action for U.S. Appl. No. 16/159,087, "Olefin Coordination Polymerization Catalyst and Use Thereof", dated Jul. 16, 2020.

OLEFIN COORDINATION POLYMERIZATION CATALYST, AND PREPARATION METHOD AND APPLICATION THEREOF

CROSS-REFERENCE TO RELATED APPLICATIONS

This application is a continuation of International Application No. PCT/CN2017/074498, filed on Feb. 23, 2017, which claims priority under 35 U.S.C. § 119 or 365 to Chinese Patent Application No. 201610289266.1, filed on May 4, 2016, both of which are hereby incorporated by reference in their entireties.

FIELD OF TECHNOLOGY

The present invention relates to a catalyst for olefin homopolymerization or copolymerization, and a preparation method and application thereof, and belongs to the technical field of olefin high-efficiency polymerization catalyst and olefin polymerization.

BACKGROUND ART

Olefin polymerization catalysts are at the heart of polyolefin polymerization technology. From the viewpoint of the development of olefin polymerization catalysts, generally there are two main aspects: (1) development of polyolefin resin catalysts capable of preparing special properties or having more excellent properties, such as metallocene catalysts and non-metallocene late transition metal catalysts; (2) simplification of the catalyst preparation process, reduction of the catalyst cost, and development of environmentally friendly technology on the basis of further improving the performance of the catalyst, to improve the benefit and enhance the competitiveness, for the production of general-purpose polyolefin resin. Prior to the 1980s, the research of polyethylene catalysts focused on the pursuit of catalyst efficiency. After nearly 30 years of effort, the catalytic efficiency of polyethylene catalysts has increased by orders of magnitude, which simplifies the production process of polyolefins and reduces energy consumption and material consumption.

It has been nearly 60 years since the appearance of Ziegler-Natta catalyst. Although polyolefin catalysts such as metallocene and non-metallocene have appeared during the period, there are many industrialization problems, such as expensive co-catalyst, and difficulty in primary catalyst loading. Therefore, in terms of current industrial production and market share, the traditional Z-N catalyst will remain the dominant player in the field of olefin polymerization for some time to come. In recent years, Z-N catalyst products at home and abroad are continuously emerging, and the catalyst stability and polymerization catalytic activity have also been continuously improved. However, it is still deficient in the hydrogen response, control of catalyst particle regularity, and particle size distribution. At present, it is desired to develop a spherical or spheroidal catalyst having a simple preparation process, a good hydrogen response, and a uniform particle size distribution.

Chinese Patent 96106647.4 discloses an olefin polymerization catalyst and a preparation method thereof, wherein the carrier $MgCl_2$ is dissolved in a mixture of an alcohol and an alkane to form a liquid $MgCl_2$ alcohol adduct, and this liquid $MgCl_2$ alcohol adduct is contacted with $TiCl_4$ to obtain an olefin polymerization catalyst, but the catalyst has a poor hydrogen response, and the melt flow rate MFR of the polyethylene can only be adjusted in the range of 0.1 g/10 min to 220 g/10 min.

Chinese Patent 200480008242.X discloses an olefin polymerization catalyst and a preparation method thereof, wherein the carrier $MgCl_2$ is directly dissolved in ethanol to prepare a solid $MgCl_2$ alcohol adduct, and then $TiCl_4$ is supported on the solid $MgCl_2$ alcohol adduct, to obtain the olefin polymerization catalyst.

Chinese Patent 201110382706.5 discloses an olefin polymerization catalyst and a preparation method thereof, wherein the carrier $MgCl_2$ is dissolved in an organic solvent of isooctanol and ethanol to prepare a solid $MgCl_2$ alcohol adduct, and then $TiCl_4$ is supported on the solid $MgCl_2$ alcohol adduct, to obtain the olefin polymerization catalyst. This catalyst has a good hydrogen response. However, the catalyst activity is low and the primary catalyst particles tend to stick to the vessel wall.

Chinese Patents CN85100997A, CN200810227369.0, CN200810227371.8 and CN200810223088.8 disclose an olefin polymerization catalyst and a preparation method thereof, wherein $MgCl_2$ particles are dissolved in a system of an organic epoxy compound, an organophosphorus compound and an inert organic solvent to give $MgCl_2$ solution, which is then contacted with $TiCl_4$, to obtain an olefin polymerization primary catalyst. The organophosphorus compound serves as an essential component in the solvent system which dissolves the $MgCl_2$ particles.

Chinese Patent 201310598556.0 discloses that during the preparation of the catalyst, an inert organic solvent, a monohydric alcohol having a carbon number of less than 5 and an alcohol having a carbon number of more than 5 are added to dissolve $MgCl_2$ particles, and then an organophosphorus compound, an organosilicon compound and an organoboron compound are added to prepare a liquid $MgCl_2$ alcohol adduct; thereafter, $TiCl_4$ is contacted with the liquid $MgCl_2$ alcohol adduct, and then a polyhydroxy solid is added, to obtain an olefin polymerization catalyst, which can improve the particle morphology of the solid primary catalyst, the hydrogen response in the catalytic olefin polymerization, and the bulk density of polyolefin.

Chinese Patent 201310034134.0 discloses that during the preparation of the catalyst, an inert organic solvent, an alcohol having a carbon number of less than 5 and an alcohol having a carbon number of more than 5 are added to dissolve $MgCl_2$ particles, and then an organophosphorus compound and an organosilicon compound are added to prepare a liquid $MgCl_2$ alcohol adduct; thereafter, $TiCl_4$ is contacted with the liquid $MgCl_2$ alcohol adduct, and then a polyhydroxy solid is added, to obtain an olefin high-efficiency polymerization catalyst, which can improve the particle morphology of the solid primary catalyst and the hydrogen response in the catalytic olefin polymerization.

Chinese Patent 201210436136.8 discloses that during the preparation of the catalyst, an inert organic solvent, an alcohol having a carbon number of less than 5 and an alcohol having a carbon number of more than 5 are added to dissolve $MgCl_2$ particles, and then an organophosphorus compound and an organosilicon compound are added to prepare a liquid $MgCl_2$ alcohol adduct; thereafter, $TiCl_4$ is contacted with the liquid $MgCl_2$ alcohol adduct, to obtain an olefin high-efficiency polymerization catalyst, which can improve the particle morphology of the solid primary catalyst and the hydrogen response in the catalytic olefin polymerization.

SUMMARY OF THE INVENTION

In order to solve the above technical problem, it is an object of the present invention to provide an olefin coordination polymerization catalyst.

It is another object of the present invention to provide a method for preparing the above olefin coordination polymerization catalyst.

It is still another object of the present invention to provide the use of the above olefin coordination polymerization catalyst in ethylene polymerization, propylene polymerization, copolymerization of ethylene with α-olefin or copolymerization of propylene with α-olefin.

In order to achieve the above objects, the present invention provides an olefin coordination polymerization catalyst, wherein the catalyst consists of a primary catalyst mainly prepared from a magnesium compound, a transition metal halide, a $C_2$-$C_{15}$ alcohol and an electron donor in a molar ratio of 1:1-40:0.01-10:0.001-10, and a co-catalyst which is an organoaluminum compound; and the molar ratio of the transition metal halide to the co-catalyst is 1:10-500.

In the above olefin coordination polymerization catalyst, preferably, the primary catalyst is prepared from the magnesium compound, the transition metal halide, the $C_2$-$C_{15}$ alcohol, the electron donor and a silicon-containing substance in a molar ratio of 1:1-40:0.01-10:0.001-10:0.00005-1; more preferably, the silicon-containing substance comprises tetraethoxysilane and/or silica gel.

In the above olefin coordination polymerization catalyst, preferably, the primary catalyst is prepared from the magnesium compound, the transition metal halide, the $C_2$-$C_{15}$ alcohol, the electron donor and a succinic acid ester in a molar ratio of 1:1-40:0.01-10:0.001-10:0.001-1. Among these, the succinic acid ester used in the present invention is a type of conventional substances used in the art. In a specific embodiment of the invention, the succinic acid ester used is diethyl 2,3-diisopropylsuccinate.

In the above olefin coordination polymerization catalyst, preferably, the electron donor is a four-arm organoheteroether compound.

In the above olefin coordination polymerization catalyst, preferably, the four-arm organoheteroether compound is at least one of the compounds in accordance with Formula 1, Formula 1

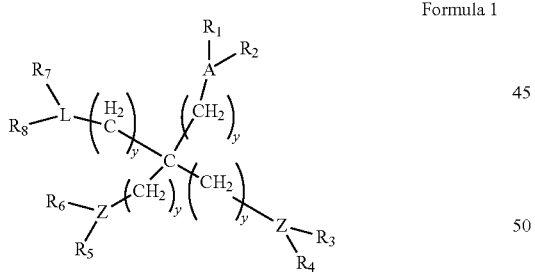

in Formula 1: y is an integer of 0-15;

$R_1$ and $R_2$ are present simultaneously or not present simultaneously, and $R_1$ and $R_2$, which are the same or different, are a $C_1$-$C_{20}$ aliphatic hydrocarbon group, a $C_3$-$C_{20}$ alicyclic group or a $C_6$-$C_{20}$ aromatic hydrocarbon group;

$R_3$ and $R_4$ are present simultaneously or not present simultaneously, and $R_3$ and $R_4$, which are the same or different, a $C_1$-$C_{20}$ aliphatic hydrocarbon group, a $C_3$-$C_{20}$ alicyclic group or a $C_6$-$C_{20}$ aromatic hydrocarbon group;

$R_5$ and $R_6$ are present simultaneously or not present simultaneously, and $R_5$ and $R_6$, which are the same or different, a $C_1$-$C_{20}$ aliphatic hydrocarbon group, a $C_3$-$C_{20}$ alicyclic group or a $C_6$-$C_{20}$ aromatic hydrocarbon group;

$R_7$ and $R_8$ are present simultaneously or not present simultaneously, and $R_7$ and $R_8$, which are the same or different, a $C_1$-$C_{20}$ aliphatic hydrocarbon group, a $C_3$-$C_{20}$ alicyclic group or a $C_6$-$C_{20}$ aromatic hydrocarbon group;

when y is an integer of 0 or 2-15, A is N, P, O or S, Z is N, P, O or S, and L is N, P, O or S;

when y is 1, A is N, P or S, Z is N, P or S, and L is N, P or S.

In the above olefin coordination polymerization catalyst, preferably, the four-arm organoheteroether compound is selected from at least one of the following compounds:

1

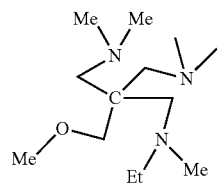

2

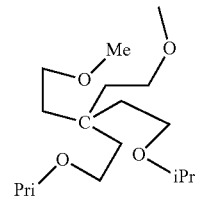

3

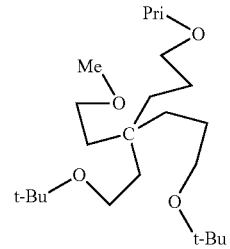

4

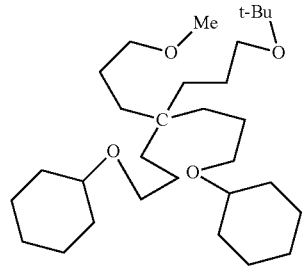

5

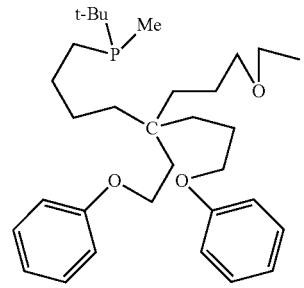

-continued
5
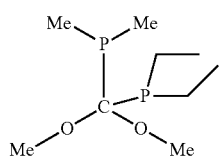
6
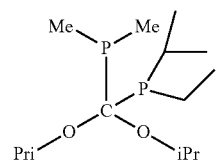
7
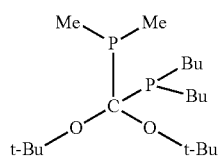
8
9
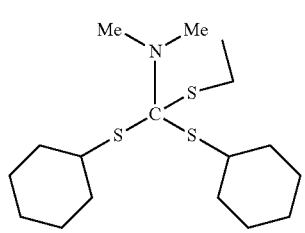
10
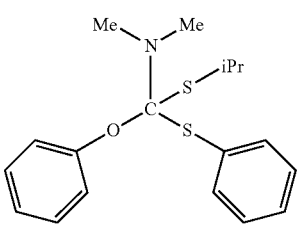
11
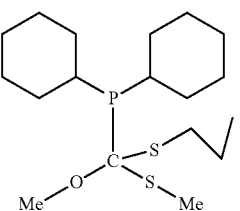
12
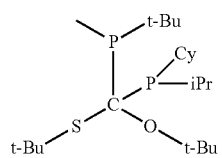
13
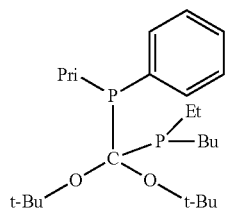
-continued
14
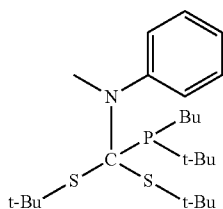
15
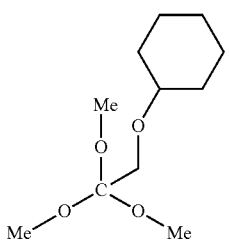
16
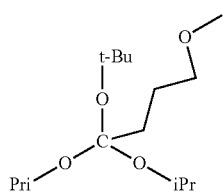
17
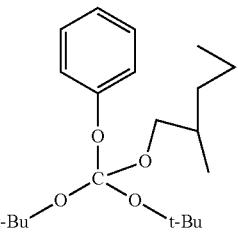
18
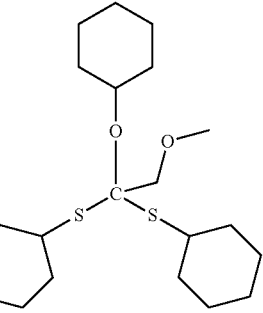
19
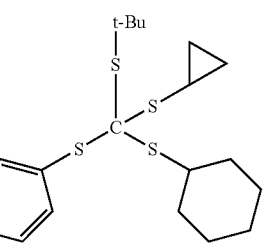

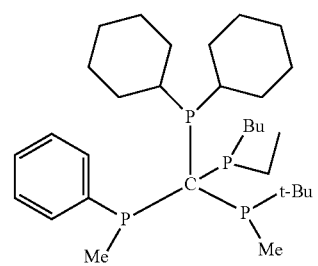
20

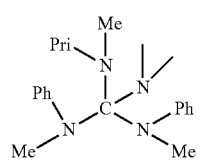
21

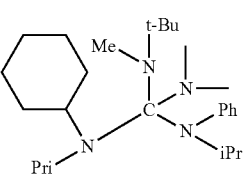
22

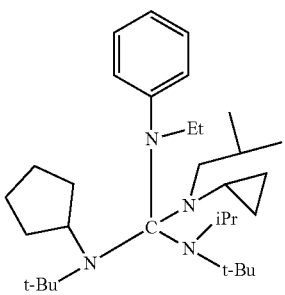
23

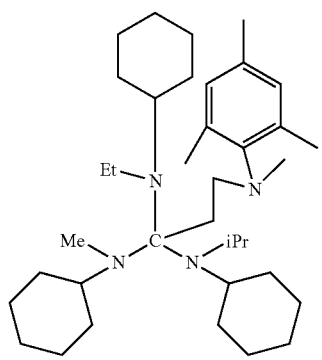
24

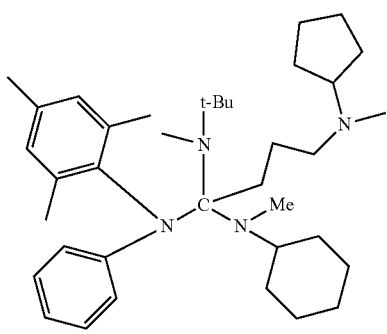
25

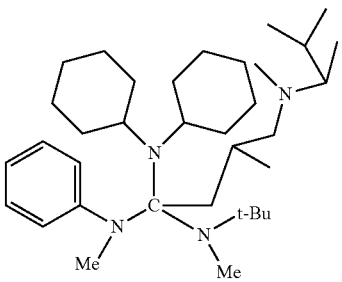
26

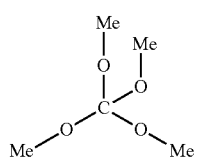
27

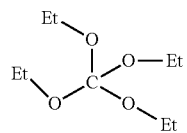
28

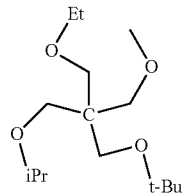
29

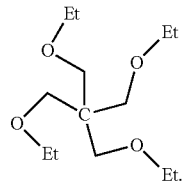
30

The addition of the four-arm organoheteroether compound can significantly improve the catalytic activity, hydrogen response and copolymerizability of the catalyst, and improve the morphology of the catalyst particles.

In the above olefin coordination polymerization catalyst, preferably, the magnesium compound is selected from at least one of the compounds of Formula $MgR_aX_b$; in the formula, R is a $C_1$-$C_{20}$ aliphatic hydrocarbon group, a $C_1$-$C_{20}$ aliphatic alkoxy group, a $C_3$-$C_{20}$ alicyclic group or a $C_6$-$C_{20}$ aromatic hydrocarbon group; X is halogen; a=0, 1 or 2; b=0, 1 or 2, and a+b=2.

In the above olefin coordination polymerization catalyst, preferably, the magnesium compound is selected from at least one of magnesium dichloride, magnesium dibromide, magnesium diiodide, methoxy magnesium chloride, ethoxy magnesium chloride, propoxy magnesium chloride, butoxy magnesium chloride, phenoxy magnesium chloride, magnesium ethoxide, magnesium isopropoxide, magnesium butoxide, isopropoxy magnesium chloride, butyl magnesium chloride, magnesium diethoxide, magnesium dipropoxide and magnesium dibutoxide; more preferably, the magnesium compound is selected from magnesium dichloride, magnesium diethoxide, or magnesium dipropoxide.

In the above olefin coordination polymerization catalyst, preferably, the transition metal halide is selected from at least one of the compounds of Formula $MR^1_{4-m}X_m$; in the formula, M is Ti, Zr, Hf, Fe, Co or Ni; X is Cl, Br or F; m is an integer of 0 to 4; $R^1$ is a $C_1$-$C_{20}$ aliphatic hydrocarbon group, a $C_1$-$C_{20}$ aliphatic alkoxy group, a $C_1$-$C_{20}$ cyclopentadienyl group and derivatives thereof, a $C_1$-$C_{20}$ aromatic hydrocarbon group, COR' or COOR', wherein R' is a $C_1$-$C_{10}$ aliphatic group or a $C_1$-$C_{10}$ aromatic group.

In the above olefin coordination polymerization catalyst, preferably, the R' is selected from at least one of methyl, ethyl, propyl, butyl, pentyl, hexyl, heptyl, octyl, nonyl, decyl, isobutyl, tert-butyl, isopentyl, tert-pentyl, 2-ethylhexyl, phenyl, naphthyl, o-methylphenyl, m-methylphenyl, p-methylphenyl, o-sulfonylphenyl, formyl, acetyl and benzoyl.

In the above olefin coordination polymerization catalyst, preferably, the transition metal halide is selected from at least one of titanium tetrachloride, titanium tetrabromide, titanium tetraiodide, titanium tetrabutoxide, titanium tetraethoxide, chlorotitanium triethoxide, dichlorotitanium diethoxide, trichlorotitanium ethoxide, n-butyl titanate, isopropyl titanate, methoxytitanium trichloride, dibutoxytitanium dichloride, tributoxytitanium chloride, titanium tetraphenoxide, chlorotitanium triphenoxide, dichlorotitanium diphenoxide and trichlorotitanium phenoxide; more preferably, the transition metal halide is titanium tetrachloride.

In the above olefin coordination polymerization catalyst, preferably, the molar ratio of the transition metal halide to the magnesium compound is 8-40:1.

In the above olefin coordination polymerization catalyst, preferably, the $C_2$-$C_{15}$ alcohol is selected from at least one of ethanol, propanol, butanol, pentanol, heptanol, isooctanol, octanol, nonanol, decanol, undecanol, dodecanol, tridecanol, tetradecanol and pentadecanol; more preferably, the $C_2$-$C_{15}$ alcohol is selected from ethanol or isooctanol. The addition of the $C_2$-$C_{15}$ alcohol (an alcohol having 2 to 15 carbon atoms) can significantly improve the hydrogen response of the catalyst.

In the above olefin coordination polymerization catalyst, preferably, the organoaluminum compound is selected from at least one of triethyl aluminum, triisobutyl aluminum, tri-n-hexyl aluminum, monochlorodiethyl aluminum and methyl aluminoxane (MAO).

The present invention further provides a method for preparing the above olefin coordination polymerization catalyst, wherein the method for preparing the primary catalyst comprises the following steps:

Step 1: dispersing the magnesium compound in an inert organic solvent, adding the C2-C15 alcohol, and stirring at 90 to 150° C. for 1-5 h;

Step 2: cooling the mixture system of Step 1 to 30-80° C., adding the electron donor, and reacting for 1-5 h;

Step 3: cooling the mixture system of Step 2 to −20-30° C., contacting the mixture system of Step 2 with the transition metal halide, reacting at −20-30° C. for 0.5-5 h, then warming the system to 50-120° C., reacting for 0.5-5 h, after the completion of the reaction, washing, filtering, and vacuum drying, to obtain the primary catalyst.

According to a specific embodiment of the invention, when the primary catalyst is prepared from the magnesium compound, the transition metal halide, the $C_2$-$C_{15}$ alcohol, the electron donor and a silicon-containing substance, the method for preparing the primary catalyst comprises the following steps:

Step 1: dispersing the magnesium compound in an inert organic solvent, adding the $C_2$-$C_{15}$ alcohol, and stirring at 90 to 150° C. for 1-5 h;

Step 2: cooling the mixture system of Step 1 to 30-80° C., adding the electron donor and the silicon-containing substance, and reacting for 1-5 h;

Step 3: cooling the mixture system of Step 2 to −20-30° C., contacting the mixture system of Step 2 with the transition metal halide, reacting at −20-30° C. for 0.5-5 h, then warming the system to 50-120° C., reacting for 0.5-5 h, after the completion of the reaction, washing, filtering, and vacuum drying, to obtain the primary catalyst.

According to a specific embodiment of the invention, when the primary catalyst is prepared from the magnesium compound, the transition metal halide, the $C_2$-$C_{15}$ alcohol, the electron donor and a succinic acid ester, the method for preparing the primary catalyst comprises the following steps:

Step 1: dispersing the magnesium compound in an inert organic solvent, adding the $C_2$-$C_{15}$ alcohol, and stirring at 90 to 150° C. for 1-5 h;

Step 2: cooling the mixture system of Step 1 to 30-80° C., adding the electron donor and the succinic acid ester, and reacting for 1-5 h;

Step 3: cooling the mixture system of Step 2 to −20-30° C., contacting the mixture system of Step 2 with the transition metal halide, reacting at −20-30° C. for 0.5-5 h, then warming the system to 50-120° C., reacting for 0.5-5 h, after the completion of the reaction, washing, filtering, and vacuum drying, to obtain the primary catalyst.

According to a specific embodiment of the invention, during the preparation of the primary catalyst, the $C_2$-$C_{15}$ alcohol can be added stepwise. For example, a part of the $C_2$-$C_{15}$ alcohol can be added in Step 1, and another portion of $C_2$-$C_{15}$ alcohol is added after the electron donor (the four-arm organoheteroether compound) is added, or the silicon-containing substance or succinic acid ester is added in Step 2. Moreover, the amount of the $C_2$-$C_{15}$ alcohol to be added in each step is not particularly limited in the present invention, as long as the total amount of the $C_2$-$C_{15}$ alcohol to be added is within the claimed range of the present application.

During the preparation of the primary catalyst, preferably, the inert organic solvent in Step 1 is at least one of a $C_5$-$C_{15}$ saturated hydrocarbon, a $C_5$-$C_{10}$ alicyclic hydrocarbon, and a $C_6$-$C_{15}$ aromatic hydrocarbon; more preferably, the inert organic solvent is selected from at least one of decane, octane, dodecane, toluene, xylene, hexane, heptane and cyclohexane.

During the preparation of the primary catalyst, the washing and filtration in Step 3 is washing the product with toluene or n-hexane, and removing the unreacted material by filtration followed by vacuum drying.

During the preparation of the primary catalyst, preferably, in Step 3, the vacuum drying temperature is 40-90° C. and the vacuum drying time is 0.5-5 h.

The present invention further provides the use of the above olefin coordination polymerization catalyst in ethylene polymerization, propylene polymerization, copolymerization of ethylene with α-olefin or copolymerization of propylene with α-olefin.

According to a specific embodiment of the invention, in the use, preferably, the α-olefin is a $C_3$-$C_{20}$ olefin; more preferably, the α-olefin is selected from at least one of propylene, 1-butene, 1-hexene, 1-octene, 1-decene, 3-methyl-1-butene, cyclopentene, 4-methyl-1-pentene, 1,3-butadiene, isoprene, styrene and methylstyrene.

The olefin polymerization catalyst provided by the present invention has the following beneficial effects.

During the preparation of the catalyst, the addition of the electron donor (the four-arm organoheteroether compound) after the magnesium halide carrier is dissolved can significantly increase the catalytic activity of the catalyst, can eliminate the static electricity of the solid primary catalyst particles, and prevent the primary catalyst particles from sticking to the vessel wall; the addition of the inert organic solvent, the alcohol having a carbon number from 2 to 15, the magnesium compound carrier and then the electron donor to prepare the magnesium compound alcohol adduct, and then the contact of the transition metal halide ($TiCl_4$) with the magnesium compound alcohol adduct to obtain an olefin high-efficiency polymerization catalyst, can improve the particle morphology of the solid primary catalyst and the hydrogen response of the catalytic olefin polymerization; and the addition of the electron donor can significantly increase the catalytic activity of the catalyst, improve the particle morphology of the catalyst, eliminate the static electricity of the solid primary catalyst particles, and prevent the primary catalyst particles from sticking to the vessel wall. The olefin polymerization catalyst provided by the present invention has good particle morphology and a uniform particle size distribution; the catalyst has an excellent hydrogen response, and the melt flow rate MFR of polyethylene can be adjusted within 0.01 g/10 min-550 g/10 min. The catalyst loading is high, the catalyst activity is high, and the solid primary catalyst particles do not stick to the vessel wall; the polymer particles have a good morphology, a high bulk density and less fine powder; and the catalyst is suitable for slurry polymerization process, loop reactor polymerization process, gas phase polymerization process or combined polymerization process; the process for preparing the primary catalyst is simple, and has low requirements on equipment, low energy consumption and low environmental pollution.

The object of the present invention is to provide an olefin copolymerization catalyst having a good particle morphology, a spherical shape, and the catalyst particles not sticking to the vessel wall; the catalyst has an excellent hydrogen response, and the melt flow rate MFR of polyethylene can be adjusted within 0.01 g/10 min-550 g/10 min; the catalyst has a high activity, and is applicable in slurry polymerization process, gas phase polymerization process or combined polymerization process; the preparation process is simple, and has low requirements on equipment, and low environmental pollution.

The mass percentage of Ti in the primary catalyst is determined by ICP.

The measurement conditions of the melt flow rate of the polyethylene and polyethylene copolymer are as follows: a test load of 5 kg and a temperature of 190° C.

The measurement conditions of the melt flow rate of the isotactic polypropylene are as follows: a test load of 2.16 kg and a temperature of 230° C.

DETAILED DESCRIPTION OF PREFERRED EMBODIMENTS

In order to more clearly understand the technical features, objects and advantageous effect of the present invention, the embodiments of the present invention and the advantageous effect thereof will be described in detail by way of specific examples. It is intended to provide a reader with a better understanding of the spirit and characteristics of the invention, but is not a limit to the implementable scope of the invention.

Example 1

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 0.2 mL of ethanol, and 6.5 mL of isooctanol were added, and the mixture was warmed to 120° C. under stirring and reacted for 2 h. After cooling to 50° C., 2.5 g of the four-arm organoheteroether compound 1 in accordance with the formula was added in sequence, and the temperature was kept at 50° C. and the reaction was carried out for 2 h. The system was cooled to −15° C., 30 mL of titanium tetrachloride was added dropwise and the reaction was carried out for 1 h, and the temperature was raised to 110° C. and the reaction was further carried out for 2 h. Stirring was stopped, the system was allowed to stand, layered, filtered, washed with hexane four times (30 mL each time), and dried under vacuum at 70° C. for 2 h, to obtain a powdery solid primary catalyst with good fluidity, non-sticking to the vessel wall, a uniform particle size distribution and a spherical shape.

Example 2

This example provides a method for preparing an olefin coordination polymerization catalyst, wherein the method for preparing the primary catalyst comprises the following steps.

Into a reactor thoroughly substituted with nitrogen, 1 g of magnesium dichloride, 30 mL of n-decane, 0.25 mL of ethanol, and 7 mL of isooctanol were added, and the mixture was warmed to 120° C. under stirring and reacted for 2 h. After cooling to 60° C., 1.5 g of the four-arm organoheteroether compound 2 in accordance with the formula was added in sequence, and the temperature was kept at 60° C. and the reaction was carried out for 2 h. The system was cooled to −10° C., 40 mL of titanium tetrachloride was added dropwise and the reaction was carried out for 1 h, and the temperature was raised to 100° C. and the reaction was further carried out for 3 h. Stirring was stopped, the system was allowed to stand, layered, filtered, washed with hexane four times (30 mL each time), and dried under vacuum at 60° C. for 3 h, to obtain a powdery solid primary catalyst with good fluidity, a uniform particle size distribution, non-sticking to the vessel wall, and a spherical shape.

Example 3

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 0.2 mL of ethanol, and 8 mL of isooctanol were added, and the mixture was warmed to 100° C. under stirring and reacted for 2 h. After cooling to 50° C., 13 g of the four-arm organoheteroether compound 3 in accordance with the formula was added in sequence, and the temperature was raised to 80° C. and the reaction was carried out for 2 h. The system was cooled to −15° C., 35 mL of titanium tetrachloride was added dropwise and the reaction was carried out for 1 h, and the temperature was raised to 65° C. and the reaction was further carried out for 2 h. Stirring was stopped, the system was allowed to stand, layered, filtered, washed with hexane four times (30 mL each time), and dried under vacuum at 50° C. for 4 h, to obtain a powdery solid primary catalyst with good fluidity, a uniform particle size distribution, non-sticking to the vessel wall, and a spherical shape.

Example 4

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 2 mL of ethanol, and 7 mL of isooctanol were added, and the mixture was warmed to 110° C. under stirring and reacted for 4 h. After cooling to 50° C., 0.5 g of the four-arm organoheteroether compound 4 in accordance with the formula was added in sequence, and the temperature was raised to 100° C. and the reaction was carried out for 2 h. The system was cooled to −15° C., 15 mL of titanium tetrachloride was added dropwise and the reaction was carried out for 1 h, and the temperature was raised to 120° C. and the reaction was further carried out for 2 h. Stirring was stopped, the system was allowed to stand, layered, filtered, washed with hexane four times (30 mL each time), and dried under vacuum at 80° C. for 2 h, to obtain a powdery solid primary catalyst with good fluidity, a uniform particle size distribution, non-sticking to the vessel wall, and a spherical shape.

Example 5

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 0.1 mL of ethanol, and 4 mL of isooctanol were added, and the mixture was warmed to 100° C. under stirring and reacted for 5 h. After cooling to 40° C., 5 g of the four-arm organoheteroether compound 5 in accordance with the formula was added in sequence, and the temperature was kept at 40° C. and the reaction was carried out for 2 h. The system was cooled to −15° C., 25 mL of titanium tetrachloride was added dropwise and the reaction was carried out for 3 h, and the temperature was raised to 110° C. and the reaction was further carried out for 2 h. Stirring was stopped, the system was allowed to stand, layered, filtered, washed with hexane four times (30 mL each time), and dried under vacuum at 90° C. for 2 h, to obtain a powdery solid primary catalyst with good fluidity, a uniform particle size distribution, non-sticking to the vessel wall and a spherical shape.

Example 6

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 2.5 mL of ethanol, and 3 mL of isooctanol were added, and the mixture was warmed to 110° C. under stirring and reacted for 2 h. After cooling to 50° C., 3 g of the four-arm organoheteroether compound 6 in accordance with the formula and 8 mL of tetraethoxysilane were added in sequence, and the temperature was kept at 50° C. and the reaction was carried out for 3 h. The system was cooled to −15° C., 40 mL of titanium tetrachloride was added dropwise and the reaction was carried out for 1 h, and the temperature was raised to 70° C. and the reaction was further carried out for 2 h. Stirring was stopped, the system was allowed to stand, layered, filtered, washed with hexane four times (30 mL each time), and dried under vacuum at 100° C. for 2 h, to obtain a powdery solid primary catalyst with good fluidity, a uniform particle size distribution, non-sticking to the vessel wall and a spherical shape.

Example 7

This example provides a method for preparing an olefin coordination polymerization catalyst, wherein the method for preparing the primary catalyst comprises the following steps.

Into a reactor thoroughly substituted with nitrogen, 1 g of magnesium diethoxide, 30 mL of n-heptane, and 0.2 mL of ethanol were added, and the mixture was warmed to 110° C. under stirring and reacted for 4 h. After cooling to 50° C., 6 g of the four-arm organoheteroether compound 7 in accordance with the formula and 0.2 mL of ethanol were added in sequence, and the temperature was kept at 50° C. and the reaction was carried out for 4 h. The system was cooled to −15° C., 35 mL of titanium tetrachloride was added dropwise and the reaction was carried out for 1 h, and the temperature was raised to 95° C. and the reaction was further carried out for 4 h. Stirring was stopped, the system was allowed to stand, layered, filtered, washed with toluene twice (30 mL each time) and hexane four times (30 mL each time), and dried under vacuum at 60° C. for 3 h, to obtain a powdery solid primary catalyst with good fluidity, a uniform particle size distribution, non-sticking to the vessel wall and a spherical shape.

Example 8

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of dodecane, 0.3 mL of ethanol, and 6 mL of decanol were added, and the mixture was warmed to 110° C. under stirring and reacted for 2 h. After cooling to 50° C., 6 g of the four-arm organoheteroether compound 8 in accordance with the formula was added in sequence, and the temperature was kept at 50° C. for 3 h. The system was cooled to −10° C., 30 mL of titanium tetrachloride was added dropwise and the reaction was carried out for 1 h, and the temperature was raised to 80° C. and the reaction was further carried out for 3 h. Stirring was stopped, the system was allowed to stand, layered, filtered, washed with hexane four times (30 mL each time), and dried under vacuum at 60° C. for 4 h, to obtain a powdery solid primary catalyst with good fluidity, a uniform particle size distribution, non-sticking to the vessel wall and a spherical shape.

Example 9

This example provides a method for preparing an olefin coordination polymerization catalyst, wherein the method for preparing the primary catalyst comprises the following steps.

Into a reactor thoroughly substituted with nitrogen, 1 g of magnesium dipropoxide, 30 mL of toluene, and 0.5 mL of propanol were added, and the mixture was warmed to 110° C. under stirring and reacted for 5 h. After cooling to 50° C., 6 g of the four-arm organoheteroether compound 9 in accordance with the formula was added in sequence, and the temperature was kept at 50° C. for 2 h. The system was cooled to 0° C., 15 mL of titanium tetrachloride was added dropwise and the reaction was carried out for 1 h, and the temperature was raised to 90° C. and the reaction was further carried out for 2 h. Stirring was stopped, the system was allowed to stand, layered, filtered, washed with hexane twice (30 mL each time), and dried under vacuum at 110° C. for 2 h, to obtain a powdery solid primary catalyst with good fluidity, a uniform particle size distribution, non-sticking to the vessel wall and a spherical shape.

Example 10

This example provides a method for preparing an olefin coordination polymerization catalyst, wherein the method for preparing the primary catalyst comprises the following steps.

Into a reactor thoroughly substituted with nitrogen, 1 g of magnesium dichloride, 30 mL of n-octane, 4 mL of butanol and 6.5 mL of isooctanol were added, and the mixture was warmed to 110° C. under stirring and reacted for 2 h. After cooling to 50° C., 2 g of the four-arm organoheteroether compound 10 in accordance with the formula was added, and the temperature was kept at 50° C. and the reaction was carried out for 2 h. The system was cooled to −5° C., 45 mL of titanium tetrachloride was added dropwise and the reaction was carried out for 1 h, and the temperature was raised to 90° C. and the reaction was further carried out for 2 h. Stirring was stopped, the system was allowed to stand, layered, filtered, washed with hexane four times (30 mL each time), and dried under vacuum at 120° C. for 2 h, to obtain a powdery solid primary catalyst with good fluidity, a uniform particle size distribution, non-sticking to the vessel wall and a spherical shape.

Example 11

This example provides a method for preparing an olefin coordination polymerization catalyst, wherein the method for preparing the primary catalyst comprises the following steps.

Into a reactor thoroughly substituted with nitrogen, 1 g of magnesium dichloride, 15 mL of n-decane, and 5 mL of ethanol were added, and the mixture was warmed to 110° C. under stirring and reacted for 2 h. After cooling to 50° C., 4 g of the four-arm organoheteroether compound 11 in accordance with the formula was added, and the temperature was kept at 50° C. and the reaction was carried out for 2 h. The system was cooled to 25° C., 25 mL of titanium tetrachloride at −10° C. was added dropwise and the reaction was carried out at 0° C. for 1 h, and the temperature was raised to 110° C. within 4 h and the reaction was further carried out for 2 h. Stirring was stopped, the system was allowed to stand, layered, filtered, washed with hexane four times (30 mL each time), and dried under vacuum at 50° C. for 3 h, to obtain a powdery solid primary catalyst with good fluidity, a uniform particle size distribution, non-sticking to the vessel wall and a spherical shape.

Example 12

This example provides a method for preparing an olefin coordination polymerization catalyst, wherein the method for preparing the primary catalyst comprises the following steps.

Into a reactor thoroughly substituted with nitrogen, 1 g of magnesium dichloride, 40 mL of n-decane, and 1.5 mL of ethanol were added, and the mixture was warmed to 120° C. under stirring and reacted for 2 h. After cooling to 60° C., 3 g of the four-arm organoheteroether compound 12 in accordance with the formula and 6 mL of tetraethoxysilane were added, and the temperature was kept at 60° C. and the reaction was carried out for 2 h. The system was cooled to 25° C., 25 mL of titanium tetrachloride at −15° C. was added dropwise and the reaction was carried out at −5° C. for 1 h, and the temperature was raised to 100° C. within 4 h and the reaction was further carried out for 2 h. Stirring was stopped, the system was allowed to stand, layered, filtered, washed with hexane four times (30 mL each time), and dried under vacuum at 50° C. for 3 h, to obtain a powdery solid primary catalyst with good fluidity, a uniform particle size distribution, non-sticking to the vessel wall and a spherical shape.

Example 13

This example provides a method for preparing an olefin coordination polymerization catalyst, wherein the method for preparing the primary catalyst comprises the following steps.

Into a reactor thoroughly substituted with nitrogen, 1 g of magnesium diethoxide, 20 mL of n-decane, and 3 mL of isooctanol were added, and the mixture was warmed to 110° C. under stirring and reacted for 3 h. After cooling to 50° C., 1 g of the four-arm organoheteroether compound 13 in accordance with the formula was added, and the temperature was kept at 50° C. and the reaction was carried out for 2 h. The system was cooled to 0° C., 15 mL of titanium tetrachloride was added dropwise and the reaction was carried out for 1 h, and the temperature was raised to 90° C. and the reaction was further carried out for 2 h. Stirring was stopped, the system was allowed to stand, layered, filtered, washed with hexane twice (30 mL each time), and dried under vacuum at 50° C. for 4 h, to obtain a powdery solid primary catalyst with good fluidity, a uniform particle size distribution, non-sticking to the vessel wall and a spherical shape.

Example 14

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 10 mL of toluene, 1 mL of ethanol and 6.5 mL of isooctanol were added, and the mixture was warmed to 100° C. under stirring and reacted for 4 h. After cooling to 40° C., 3 g of the four-arm organoheteroether compound 14 in accordance with the formula and 0.15 mL of silica gel were added, and the temperature was raised to 70° C. and the reaction was carried out for 2 h. The system was cooled to −15° C., 15 mL of titanium tetrachloride was added dropwise and the reaction was carried out for 1 h, and the temperature was raised

17 to 90° C. and the reaction was carried out for 2 h. Stirring was stopped, the reaction was allowed to stand, layered, filtered, washed with hexane twice (30 mL each time), and dried under vacuum at 60° C. for 2 h, to obtain a powdery solid primary catalyst with good fluidity, a uniform particle size distribution, non-sticking to the vessel wall and a spherical shape.

Example 15

This example provides a method for preparing an olefin coordination polymerization catalyst, wherein the method for preparing the primary catalyst comprises the following steps.

Into a reactor thoroughly substituted with nitrogen, 1 g of magnesium diethoxide, 20 mL of n-decane, and 6.5 mL of isooctanol were added, and the mixture was warmed to 120° C. under stirring and reacted for 0.5 h. After cooling to 50° C., 8 g of the four-arm organoheteroether compound 15 in accordance with the formula and 10 mL of succinic acid ester (diethyl 2,3-diisopropylsuccinate) were added, and the temperature was kept at 50° C. and the reaction was carried out for 3 h. The system was cooled to −15° C., 15 mL of titanium tetrachloride was added dropwise and the reaction was carried out for 1 h. And the temperature was raised to 90° C. and the reaction was further carried out for 2 h, and dried under vacuum at 60° C. for 2 h, to obtain a powdery solid primary catalyst with good fluidity, a uniform particle size distribution, non-sticking to the vessel wall and a spherical shape.

Example 16

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 10 mL of toluene, 1 mL of ethanol and 6.5 mL of isooctanol were added, and the mixture was warmed to 100° C. under stirring and reacted for 4 h. After cooling to 40° C., 6 g of the four-arm organoheteroether compound 16 in accordance with the formula was added, and the temperature was raised to 70° C. and the reaction was carried out for 2 h. The system was cooled to −15° C., 15 mL of titanium tetrachloride was added dropwise and the reaction was carried out for 1 h, and the temperature was raised to 90° C. and the reaction was carried out for 2 h. Stirring was stopped, the system was allowed to stand, layered, filtered, washed with hexane twice (30 mL each time), and dried under vacuum at 60° C. for 2 h, to obtain a powdery solid primary catalyst with good fluidity, a uniform particle size distribution, non-sticking to the vessel wall and a spherical shape.

Example 17

This example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of n-decane, 10 mL of toluene, 1 mL of ethanol and 6.5 mL of isooctanol were added, and the mixture was warmed to 100° C. under stirring and reacted for 4 h. After cooling to 40° C., 5 g of the four-arm organoheteroether compound 17 in accordance with the formula and 0.25 mL tetraethoxysilane were added, and the temperature was raised to 70° C. and the reaction was carried out for 2 h. The system was cooled to −15° C., 15 mL of titanium tetrachloride was added dropwise and the reaction was carried out for 1 h, and the temperature was raised to 90° C. and the reaction was carried out for 2 h. Stirring was stopped, the system was allowed to stand, layered, filtered, washed with hexane twice (30 mL each time), and dried under vacuum at 60° C. for 2 h, to obtain a powdery solid primary catalyst with good fluidity, a uniform particle size distribution, non-sticking to the vessel wall and a spherical shape.

Example 18

This example provides a method for preparing an olefin coordination polymerization catalyst, wherein the method for preparing the primary catalyst comprises the following steps.

Into a reactor thoroughly substituted with nitrogen, 1 g of magnesium diethoxide, 30 mL of n-hexane, and 0.2 mL of ethanol were added, and the mixture was warmed to 100° C. under stirring and reacted for 4 h. After cooling to 40° C., 3 g of the four-arm organoheteroether compound 18 in accordance with the formula was added, and the temperature was raised to 70° C. and the reaction was carried out for 2 h. The system was cooled to −15° C., 15 mL of titanium tetrachloride was added dropwise and the reaction was carried out for 1 h, and the temperature was raised to 90° C. and the reaction was carried out for 2 h. Stirring was stopped, the system was allowed to stand, layered, filtered, washed with hexane twice (30 mL each time), and dried under vacuum at 60° C. for 2 h, to obtain a powdery solid primary catalyst with good fluidity, a uniform particle size distribution, non-sticking to the vessel wall and a spherical shape.

Comparative Example 1

This Comparative Example provides a method for preparing an olefin coordination polymerization catalyst, wherein the method for preparing the primary catalyst comprises the following steps.

Into a reactor thoroughly substituted with nitrogen, 1 g of magnesium diethoxide, 20 mL of decane, 16 mL of isooctanol, and 0.4 mL of ethanol were added, and the mixture was warmed to 110° C. under stirring and reacted for 2 h. After cooling to 50° C., 3 mL of tetraethoxysilane was added, and the temperature was kept at 50° C. and the reaction was carried out for 2 h. The system was cooled to −15° C., 35 mL of titanium tetrachloride was added dropwise and the reaction was carried out for 1 h, and the temperature was raised to 100° C. and the reaction was carried out for 2 h. Stirring was stopped, the system was allowed to stand, layered, filtered, washed with hexane four times (30 mL each time), and dried under vacuum at 80° C. for 2 h, to obtain a powdery solid primary catalyst with good fluidity, a uniform particle size distribution and a spherical shape, of which the particles tend to stick to the vessel wall.

Comparative Example 2

This Comparative Example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of decane, 16 mL of isooctanol, and 0.4 mL of ethanol were added, and the mixture was warmed to 120° C. under stirring and reacted for 3 h. After cooling to 50° C., 3 mL of tributyl phosphate and 3 mL of tetraethoxysilane were added, and the temperature was kept at 50° C. and the reaction was carried out for 2 h. The system was cooled to −15° C., 15 mL of titanium tetrachloride was added dropwise and the reaction was carried out for 1 h, and the temperature was raised to 90° C. and the reaction was carried out for 2 h. Stirring was stopped, the system was allowed to stand, layered, filtered, washed with hexane twice (30 mL each time), and dried under vacuum at 60° C. for 2 h, to obtain a powdery solid primary catalyst, of which the particles tend to stick to the vessel wall.

Comparative Example 3

This Comparative Example provides a method for preparing an olefin coordination polymerization catalyst, wherein the method for preparing the primary catalyst comprises the following steps.

Into a reactor thoroughly substituted with nitrogen, 1 g of magnesium dichloride, 20 mL of decane, 16 mL of isooctanol, and 0.4 mL of ethanol were added, and the mixture was warmed to 120° C. under stirring and reacted for 3 h. After cooling to 50° C., 3 mL of tributyl phosphate was added, and the temperature was kept at 50° C. and the reaction was carried out for 2 h. The system was cooled to −15° C., 15 mL of titanium tetrachloride was added dropwise and the reaction was carried out for 1 h, and the temperature was raised to 90° C. and the reaction was carried out for 2 h. Stirring was stopped, the reaction was allowed to stand, layered, filtered, washed with hexane twice (30 mL each time), and dried under vacuum at 60° C. for 2 h, to obtain a powdery solid primary catalyst, of which the particles tend to stick to the vessel wall.

Application Example 1

Ethylene polymerization: To a 2 liter stainless steel autoclave thoroughly substituted with nitrogen, 10 mg of the primary catalyst component, 1000 mL of dehydrated hexane and 1.17 mL (2 mmol/mL) of a co-catalyst $AlEt_3$ solution were added in sequence. After the temperature was raised to 75° C., the autoclave was charged with 0.28 MPa of hydrogen gas, then charged with ethylene to 0.73 MPa, and allowed to react at constant pressure and temperature for 2 h.

Application Example 2

Ethylene copolymerization: To a 2 liter stainless steel autoclave thoroughly substituted with nitrogen, 10 mg of the primary catalyst component, 1000 mL of dehydrated hexane, 1.17 mL (2 mmol/mL) of an $AlEt_3$ solution and 30 mL of 1-hexene were added in sequence. After the temperature was raised to 75° C., the autoclave was charged with 0.28 MPa of hydrogen gas, then charged with ethylene to 0.73 MPa, and allowed to react at constant pressure and temperature for 2 h.

Application Example 3

Propylene polymerization: To a 2 liter stainless steel autoclave thoroughly substituted with nitrogen, 10 mg of the primary catalyst component, 1000 mL of dehydrated hexane, 1.17 mL (2 mmol/mL) of an $AlEt_3$ solution and 4 mL of an external electron donor triethoxycyclopentyloxysilane (0.18M hexane solution) were added in sequence. After the temperature was raised to 80° C., the autoclave was charged with 0.1 MPa of hydrogen gas, then charged with propylene to 3 MPa, and allowed to react at constant pressure and temperature for 2 h. The olefin polymerization results of the Application Examples 1-3 are shown in Table 1.

TABLE 1

| | Olefin polymerization results | | | | | |
|---|---|---|---|---|---|---|
| Examples | Titanium content of primary catalyst (wt %) | Catalytic efficiency in Application Example 1 (kg/g cat) | Catalytic efficiency in Application Example 2 (kg/g cat) | Catalytic efficiency in Application Example 3 (kg/g cat) | Bulk density (g/cm$^3$) | Melt flow rate (g/10 min) |
| 1 | 5.0 | 25 | 27 | — | 0.32 | 2.1 |
| 2 | 4.8 | 26 | 27 | — | 0.33 | 2.0 |
| 3 | 5.1 | 24 | 24 | — | 0.34 | 2.3 |
| 4 | 5.2 | 25 | 25 | — | 0.34 | 2.0 |
| 5 | 5.3 | 24 | 24 | — | 0.35 | 1.9 |
| 6 | 5.2 | 24 | 25 | — | 0.33 | 2.0 |
| 7 | 4.8 | 23 | 23 | — | 0.32 | 1.9 |
| 8 | 4.8 | 24 | 24 | — | 0.31 | 2.1 |
| 9 | 5.1 | 24 | 25 | — | 0.32 | 1.8 |
| 10 | 4.7 | 23 | 23 | — | 0.33 | 2.0 |
| 11 | 4.8 | 25 | 24 | — | 0.33 | 2.2 |
| 12 | 4.9 | 22 | 21 | — | 0.32 | 2.2 |
| 13 | 5.3 | 21 | 22 | — | 0.33 | 2.0 |
| 14 | 5.2 | 22 | 21 | — | 0.31 | 1.8 |
| 15 | 3.8 | — | — | 33 | 0.47 | 2.1 |
| 16 | 5.2 | 23 | 23 | — | 0.33 | 1.7 |
| 17 | 5.1 | 21 | 22 | — | 0.32 | 1.9 |
| 18 | 5.0 | 22 | 23 | — | 0.33 | 2.1 |
| Comparative Example 1 | 5.0 | 17 | 18 | — | 0.28 | 1.2 |
| Comparative Example 2 | 5.1 | 16 | 17 | — | 0.26 | 0.9 |
| Comparative Example 3 | 5.1 | 15 | 18 | — | 0.29 | 1.0 |

The effect of the present invention:

It can be seen from the Examples and Comparative Examples 1-3 of the present invention that when the four-arm organoheteroether compound is not added, the activity of the catalyst is lower and the bulk density is also lowered, indicating that the addition of the four-arm organoheteroether compound improves the morphology of the catalyst, making the catalyst particles denser, so that the bulk density thereof is increased. When the four-arm organoheteroether compound is not added, the melt flow rate of the polymer was reduced by 50% as compared with that of the polymer with the addition, indicating that the addition of the four-arm organoheteroether compound increases the hydrogen response of the catalyst.

During the preparation of the catalyst of the present invention, the carrier is dispersed and the alcohol having 2 to 15 carbon atoms is added, and the solution in which magnesium halide is dissolved does not comprise the organic epoxy compound and the organophosphorus compound. The addition of the organic epoxy compound and the organophosphorus compound may affect the morphology and precipitation rate of microcrystals precipitated in the late stage of adding titanium dropwise to magnesium halide, which has a significant influence on the morphology of the catalyst and the titanium loading, thereby influencing the performance of the entire catalyst. In the present invention, no organic epoxy compound or organophosphorus compound is added when the carrier is dispersed, and the above adverse effects are effectively avoided. In addition, since no precipitation aid is required, the preparation process is less complex, so that the process is simple and the cost is reduced.

The catalyst of the present invention has a good particle morphology, a spherical shape and a uniform particle size distribution, and the catalyst particles do not stick to the vessel wall; the catalyst has a high activity and an excellent hydrogen response, and the melt flow rate MFR of polyethylene can be adjusted within 0.01 g/10 min-550 g/10 min; the catalyst is applicable in slurry polymerization process, loop reactor polymerization process, gas phase polymerization process or combined polymerization process. It is believed that the addition of the four-arm organoheteroether compound can significantly increase the catalytic activity, hydrogen response and copolymerizability of the catalyst, improve the particle morphology of the catalyst, can eliminate the static electricity of the solid primary catalyst particles, and prevent the primary catalyst particles from sticking to the vessel wall.

Of course, there are other various embodiments for the present invention, and a person skilled in the art can make various corresponding changes and modifications in accordance with the present invention without departing from the spirit and scope of the invention. However, such corresponding changes and modifications are intended to fall within the scope of the appended claims.

What is claimed is:

1. An olefin coordination polymerization catalyst having a primary catalyst prepared from a magnesium compound, a transition metal halide, a $C_2$-$C_{15}$ alcohol and an electron donor in a molar ratio of 1:1-40:0.01-10:0.001-10, and a co-catalyst which is an organoaluminum compound; and the molar ratio of the transition metal halide to the co-catalyst is 1:10-500;

wherein the electron donor is a four-arm organoheteroether compound having the following structure.

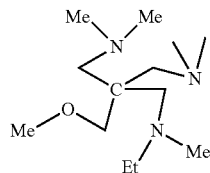

2. The olefin coordination polymerization catalyst according to claim 1, wherein the magnesium compound is selected from at least one of the compounds of Formula $MgR_aX_b$; in the formula, R is a $C_1$-$C_{20}$ aliphatic hydrocarbon group, a $C_1$-$C_{20}$ aliphatic alkoxy group, a $C_3$-$C_{20}$ alicyclic group or a $C_6$-$C_{20}$ aromatic hydrocarbon group; X is halogen; a=0, 1 or 2; b=0, 1 or 2, and a+b=2.

3. The olefin coordination polymerization catalyst according to claim 2, wherein the magnesium compound is selected from at least one of magnesium dichloride, magnesium dibromide, magnesium diiodide, methoxy magnesium chloride, ethoxy magnesium chloride, propoxy magnesium chloride, butoxy magnesium chloride, phenoxy magnesium chloride, magnesium ethoxide, magnesium isopropoxide, magnesium butoxide, isopropoxy magnesium chloride, butyl magnesium chloride, magnesium diethoxide, magnesium dipropoxide and magnesium dibutoxide.

4. The olefin coordination polymerization catalyst according to claim 1, wherein the transition metal halide is selected from at least one of the compounds of Formula $MR^1_{4-m}X_m$; in the formula, M is Ti, Zr, Hf, Fe, Co or Ni; X is Cl, Br or F; m is an integer of 0 to 4; $R^1$ is a $C_1$-$C_{20}$ aliphatic hydrocarbon group, a $C_1$-$C_{20}$ aliphatic alkoxy group, a $C_1$-$C_{20}$ cyclopentadienyl group, a $C_1$-$C_{20}$ aromatic hydrocarbon group, COR' or COOR', wherein R' is a $C_1$-$C_{10}$ aliphatic group or a $C_1$-$C_{10}$ aromatic group.

5. The olefin coordination polymerization catalyst according to claim 4, wherein the transition metal halide is selected from at least one of titanium tetrachloride, titanium tetrabromide, titanium tetraiodide, titanium tetrabutoxide, titanium tetraethoxide, chlorotitanium triethoxide, dichlorotitanium diethoxide, trichlorotitanium ethoxide, n-butyl titanate, isopropyl titanate, methoxytitanium trichloride, dibutoxytitanium dichloride, tributoxytitanium chloride, titanium tetraphenoxide, chlorotitanium triphenoxide, dichlorotitanium diphenoxide and trichlorotitanium phenoxide.

6. The olefin coordination polymerization catalyst according to claim 1, wherein the molar ratio of the transition metal halide to the magnesium compound is 8-40:1.

7. The olefin coordination polymerization catalyst according to claim 1, wherein the $C_2$-$C_{15}$ alcohol is selected from at least one of ethanol, propanol, butanol, pentanol, heptanol, isooctanol, octanol, nonanol, decanol, undecanol, dodecanol, tridecanol, tetradecanol and pentadecanol.

8. The olefin coordination polymerization catalyst according to claim 1, wherein the organoaluminum compound is selected from at least one of triethyl aluminum, triisobutyl aluminum, tri-n-hexyl aluminum, monochlorodiethyl aluminum and methyl aluminoxane.

9. A method for preparing the olefin coordination polymerization catalyst according to claim 1, wherein the method for preparing the primary catalyst comprises:

a) dispersing the magnesium compound in an organic solvent, adding the $C_2$-$C_{15}$ alcohol, and stirring at 90 to 150° C. for 1-5 hours;

b) cooling the mixture of a) to 30-80° C., adding the electron donor, and reacting for 1-5 hours; and
c) cooling the mixture of b) to −20-30° C., contacting the mixture of b) with the transition metal halide, reacting at −20-30° C. for 0.5-5 hours, then warming to 50-120° C., reacting for 0.5-5 hours, after the completion of the reaction, washing, filtering, and vacuum drying, to obtain the primary catalyst.

10. The method for preparing the olefin coordination polymerization catalyst according to claim 9, wherein in a), the organic solvent is at least one of a $C_5$-$C_{15}$ saturated hydrocarbon, a $C_5$-$C_{10}$ alicyclic hydrocarbon, and a $C_6$-$C_{15}$ aromatic hydrocarbon.

11. The method for preparing the olefin coordination polymerization catalyst according to claim 9, wherein in c), the vacuum drying temperature is 40-90° C. and the vacuum drying time is 0.5-5 hours.

12. A method for ethylene polymerization, propylene polymerization, copolymerization of ethylene with α-olefin or copolymerization of propylene with α-olefin comprising using the olefin coordination polymerization catalyst according to claim 1.

13. The method according to claim 12, wherein α-olefin is a $C_3$-$C_{20}$ olefin.

14. An olefin coordination polymerization catalyst having a primary catalyst is prepared from a magnesium compound, a transition metal halide, a $C_2$-$C_{15}$ alcohol, an electron donor and a silicon-containing substance in a molar ratio of 1:1-40:0.01-10:0.001-10:0.00005-1, and a co-catalyst which is an organoaluminum compound; and the molar ratio of the transition metal halide to the co-catalyst is 1:10-500;

wherein the electron donor is a four-arm organoheteroether compound having the following structure

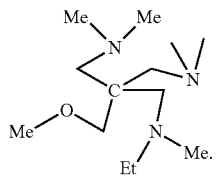

15. The method for preparing the olefin coordination polymerization catalyst according to claim 14, wherein when the primary catalyst is prepared from the magnesium compound, the transition metal halide, the $C_2$-$C_{15}$ alcohol, the electron donor and a silicon-containing substance, the method for preparing the primary catalyst comprises:

a) dispersing the magnesium compound in an organic solvent, adding the $C_2$-$C_{15}$ alcohol, and stirring at 90 to 150° C. for 1-5 hours;
b) cooling the mixture of a) to 30-80° C., adding the electron donor and the silicon-containing substance, and reacting for 1-5 hours; and
c) cooling the mixture of b) to −20-30° C., contacting the mixture of b) with the transition metal halide, reacting at −20-30° C. for 0.5-5 hours, then warming to 50-120° C., reacting for 0.5-5 hours, after the completion of the reaction, washing, filtering, and vacuum drying, to obtain the primary catalyst.

16. An olefin coordination polymerization catalyst having a primary catalyst prepared from a magnesium compound, a transition metal halide, a $C_2$-$C_{15}$ alcohol, an electron donor and a succinic acid ester in a molar ratio of 1:1-40:0.01-10:0.001-10:0.001-1, and a co-catalyst which is an organoaluminum compound; and the molar ratio of the transition metal halide to the co-catalyst is 1:10-500;

wherein the electron donor is a four-arm organoheteroether compound having the following structure

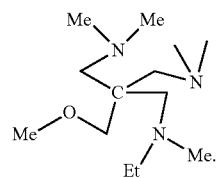

17. The method for preparing the olefin coordination polymerization catalyst according to claim 16, wherein when the primary catalyst is prepared from the magnesium compound, the transition metal halide, the $C_2$-$C_{15}$ alcohol, the electron donor and a succinic acid ester, the method for preparing the primary catalyst comprises:

a) dispersing the magnesium compound in an organic solvent, adding the $C_2$-$C_{15}$ alcohol, and stirring at 90 to 150° C. for 1-5 hours;
b) cooling the mixture of a) to 30-80° C., adding the electron donor and the succinic acid ester, and reacting for 1-5 hours; and
c) cooling the mixture of b) to −20-30° C., contacting the mixture of b) with the transition metal halide, reacting at −20-30° C. for 0.5-5 hours, then warming to 50-120° C., reacting for 0.5-5 hours, after the completion of the reaction, washing, filtering, and vacuum drying, to obtain the primary catalyst.

* * * * *

UNITED STATES PATENT AND TRADEMARK OFFICE
CERTIFICATE OF CORRECTION

PATENT NO. : 11,014,994 B2
APPLICATION NO. : 16/161894
DATED : May 25, 2021
INVENTOR(S) : Mingge Zhang et al.

It is certified that error appears in the above-identified patent and that said Letters Patent is hereby corrected as shown below:

In the Claims

In Claim 13, Column 23, Line 24, after "wherein" insert --the--.

In Claim 14, Column 23, Line 27, after "catalyst" delete "is".

Signed and Sealed this
Sixth Day of July, 2021

Drew Hirshfeld
*Performing the Functions and Duties of the
Under Secretary of Commerce for Intellectual Property and
Director of the United States Patent and Trademark Office*